United States Patent [19]

Tsujimoto

[11] Patent Number: 5,479,417
[45] Date of Patent: Dec. 26, 1995

[54] ERROR CORRECTION APPARATUS CAPABLE OF IMPROVING ERROR CORRECTION ABILITY WITHOUT EXPANSION OF A FREQUENCY BAND

[75] Inventor: Ichiro Tsujimoto, Tokyo, Japan

[73] Assignee: NEC Corporation, Japan

[21] Appl. No.: 182,220

[22] Filed: Jan. 14, 1994

[30] Foreign Application Priority Data

Jan. 14, 1993 [JP] Japan ................................. 5-004630

[51] Int. Cl.⁶ ............................... H04J 1/18; H04L 1/00
[52] U.S. Cl. ........................................ 371/37.1; 370/69.1
[58] Field of Search ......................... 371/37.1; 455/105; 375/34, 60, 61, 77; 370/70, 69.1

[56] References Cited

U.S. PATENT DOCUMENTS 5,243,629  9/1993  Wei ............................................. 375/59
5,278,844  1/1994  Murphy et al. ........................... 371/37.1

FOREIGN PATENT DOCUMENTS 51725    9/1981   European Pat. Off. .
3232599  9/1982   Germany .
63-2433  1/1988   Japan .

OTHER PUBLICATIONS

*IEEE Transactions On Vehicular Technology*, vol. 39, No. 3, "Feedforward Transparent Tone–In–Band: Its Implmentations and Applications", pp. 235–243; Aug. 1990.
*IEEE Transactions On Communications*, vol. 37, No. 10, "An Improved Channel Coding Algorithm for Low–Frequency Spectral Suppression", pp. 1088–1091; Oct. 1989.
Patent Abstracts Of Japan, vol. 10, N. 228 (E–426); JP A 61 063 126, Apr. 1, 1986.
Loh–Ming Li, et al., "Rejection of CW Interference in OPSK Systems Using Decision–Feedback Filters", *IEEE Transactions on Communications*, vol. COM–31, No. 4, Apr. 1983.
I. Tsujimoto et al., "Wide Band Interference Cancellation by a Decision Feedback Equalizer", Paper B–331, Autumn Meeting (1992) held by Electronic Information Communication Institute in Japan.
I. Tsujimoto, et al., "CW Interference Cancellation Characteristic in Multipaths of Decision Feedback Equalizer", Paper B–418, Spring National Meeting (1992) held by Electronic Communication Information Institute in Japan.

*Primary Examiner*—Stephen M. Baker
*Attorney, Agent, or Firm*—Ostrolenk, Faber, Gerb & Soffen

[57] ABSTRACT

In an error correction apparatus which includes a transmitter and a receiver and which transmits, from the transmitter to the receiver, a block code which is composed of a data bit signal sequence and a check bit signal sequence for correction of the data bit signal sequence and which has a predetermined frequency band, the transmitter modulates the check bit signal sequence so that a check bit modulated signal is located in a part of the predetermined frequency band with the remaining frequency band occupied by a data bit modulated signal. The receiver separates the data bit modulated signal from the check bit modulated signal by the use of a decision feedback equalizer and a band pass filter to reproduce the data bit signal sequence and the check bit signal sequence and to correct an error of the data bit signal sequence with reference to the check bit signal sequence reproduced in the receiver.

7 Claims, 4 Drawing Sheets

ERROR CORRECTION APPARATUS CAPABLE OF IMPROVING ERROR CORRECTION ABILITY WITHOUT EXPANSION OF A FREQUENCY BAND

BACKGROUND OF THE INVENTION

This invention relates to an error correction apparatus for use in a digital radio system and a transmitter and a receiver both of which are included in the error correction apparatus.

In general, an error correction apparatus of the type described carries out error correction by using a block code, such as a BCH code or the like, in a digital radio system. As a result, an error which might occur in a transmission path or the like is detected and corrected by a receiver of the error correction apparatus in response to the block code in a manner as mentioned in Japanese Unexamined Patent Publication No. Sho 63-2433, namely, 2433/1988.

More specifically, input data bit signals are successively inputted to a transmitter of the error correction apparatus in the form of continuous data signals which are different from a burst data signal. In the transmitter, a sequence of check bit signals is calculated for a predetermined number of bits, namely, a sequence of the input data bit signals and is multiplexed with the input data bit signal sequence by a multiplexer into a multiplexed signal which has a bit rate different from each of the input data bit signal sequence and the check bit signal sequence. The multiplexed signal is transmitted through the transmission path to the receiver of the error correction apparatus.

It is to be noted here that each bit of the multiplexed signal, namely, the block code, has a period shorter than each bit of the input data bit signals with the check bit signal sequence included in the block code. Such an addition of the check bit signal sequence brings about inevitably widening a frequency bandwidth of the block signal as compared with a frequency bandwidth of the input data bit signals. Such a block code is finally transmitted from the transmitter through the transmission path to the receiver as a radio transmission signal.

With this structure, the radio transmission signal has a wide frequency bandwidth so as to transmit the block code of a wide frequency bandwidth as described above. In other words, the frequency bandwidth of the radio transmission signal is widely spread by adding the check bit signal sequence to the input data bit signal sequence.

On the other hand, a strict frequency bandwidth restriction has been generally entailed on a digital microwave channel which limits redundancy. Such a limitation of redundancy makes it difficult in the digital radio system to use a code which has strong correction ability.

In addition, consideration should be also made about occurrence of serious multipath fading which can not be adaptively equalized. Taking this into account, increasing the bandwidth is undesirable in the radio transmission signal. Therefore, it is preferable in the digital radio system to avoid increasing the bandwidth of the radio transmission signal. Under the circumstances, the radio transmission signal can neither have desired correction ability without an increase of the bandwidth of the radio transmission signal nor can it strengthen correction ability so as to cope with serious multipath fading.

SUMMARY OF THE INVENTION

It is an object of this invention to provide an error correction apparatus which is capable of accomplishing desired correction ability without an increase in the bandwidth.

It is another object of this invention to provide a transmitter which is included in the error correction apparatus and which can transmit a block code of strong correction ability without an increase of the bandwidth.

It is still another object of this invention to provide a receiver which can receive and reproduce the above-mentioned block code when it is used in combination with the transmitter.

An error correction apparatus according to this invention comprises a transmitter and a receiver to transmit a sequence of data bit signals and a sequence of check bit signals between the transmitter and the receiver. The transmitter comprises first means for calculating the check bit signal sequence for the data bit signal sequence, second means supplied with the check bit signal sequence for converting a rate of the check bit signal sequence to produce a converted check bit signal sequence which has a time interval equal to the predetermined time interval of the data bit signal sequence, and third means supplied with the converted check bit signal sequence and the data bit signal sequence for individually modulating the converted check bit signal sequence and the data bit signal sequence by the use of a predetermined carrier frequency into a check bit modulated wave and a data bit modulated wave, respectively. The data bit modulated wave has a central data frequency and a data frequency band laid around the central data frequency while the check bit modulated wave has a central check bit frequency equal to the data central frequency. The transmitter further comprises fourth means supplied with the data bit modulated wave for fading the central data frequency of the data bit modulated wave to produce a faded data bit modulated wave, fifth means supplied with the faded data bit modulated wave and the check bit modulated wave for combining the faded data bit modulated wave with the check bit modulated wave to produce a combined wave which includes the attenuated data bit modulated wave and the check bit modulated wave, and sixth means supplied with the combined wave for producing the combined wave as the transmission signal. The receiver comprises seventh means for receiving the transmission signal as a reception wave to detect the reception signal and to produce a detection signal representative of the reception wave, eighth means supplied with the detection signal for carrying out a decision feedback equalization of the detection signal to produce a sequence of detected data signals, ninth means supplied with the detection signal for extracting the check bit signal sequence to produce an extracted check bit sequence, tenth means supplied with the detected data bit signal sequence and the extracted check bit sequence for inversely converting the detected data bit signal sequence and the extracted check bit sequence in each bit rate into a reversed data bit signal sequence and a reversed check bit sequence, respectively, and to multiplex the reversed data bit signal sequence and the reversed check bit sequence into a multiplexed block code, and eleventh means supplied with the multiplexed block code for correcting at least one error of the multiplexed block code to produce an error-corrected data bit signal sequence representative of the data signal sequence.

DESCRIPTION OF THE PREFERRED EMBODIMENTS

Figure 1:
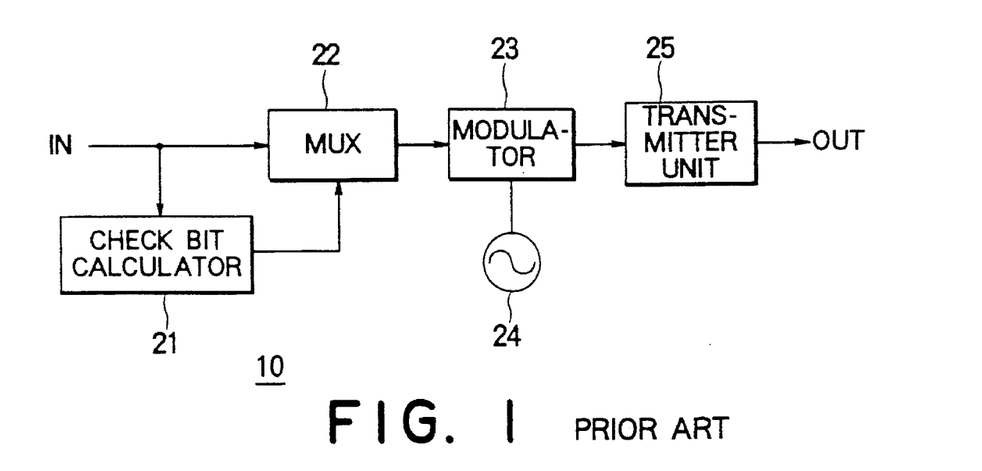
FIG. 1 is a block diagram of a conventional transmitter for use in a conventional error correction apparatus.
Figure 2:
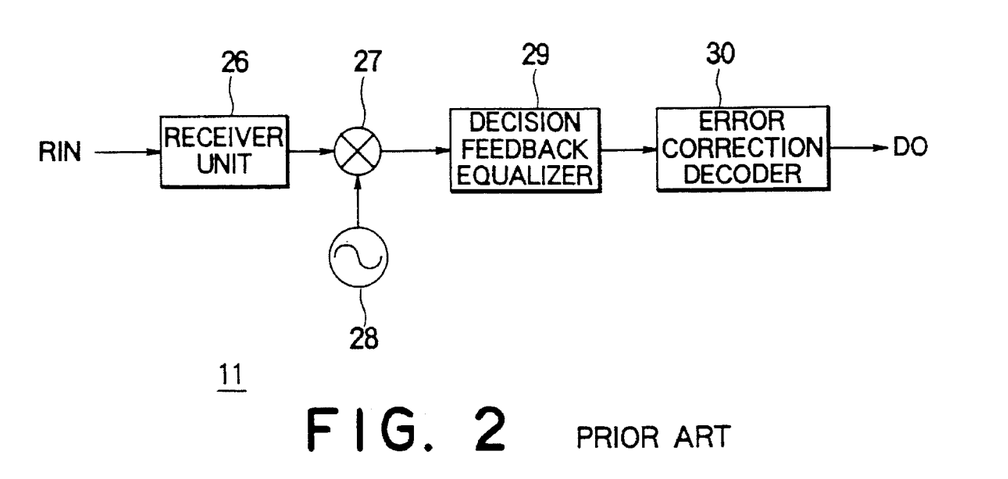
FIG. 2 is a block diagram of a conventional receiver for use in combination with the transmitter illustrated in FIG. 1.

Referring to FIGS. 1 and 2, description will be made about a conventional error correction apparatus which includes a transmitter 10 and a receiver 11 as illustrated in FIGS. 1 and 2, respectively. In FIG. 1, the transmitter 10 is successively supplied from an external device (not shown) with input data signals IN which are divisible into a plurality of input data bit signal sequences and which are not given in the form of bursts. Each of the input data bit signal sequences is composed of a predetermined number of bits, for example, twenty-one bits and is given to a check bit calculator 21 on one hand and to a multiplexer 22 on the other hand.

Supplied with each of the input data signal sequences, the check bit calculator 21 calculates a sequence of check bit signals for each input data bit signal sequence in accordance with a predetermined algorithm determined for a block code which may be, for example, a BCH (31, 21) code. For brevity of description, the BCH (31, 21) code is assumed to be used as the block code in the illustrated error correction apparatus. In such event, the check bit calculator 21 calculates the check bit sequence of ten bits for each input data bit signal sequence of twenty-one bits in a known manner and sends the check bit signal sequence to the multiplexer 22.

The multiplexer 22 multiplexes each input data bit signal sequence and the check bit signal sequence into a multiplexed signal of thirty-one bits which is subjected to bit rate conversion and which may be called the block code. As a result of the bit rate conversion, a bit rate of the block code is higher than that of the input data bit signal sequence. Otherwise, the following input data bit signal sequence can not be successively processed without any delay in the illustrated transmitter 10. In this connection, a time interval of each bit of the block code is shorter than a time interval of each bit of the input data bit signal sequence due to an addition of the check bit signal sequence of ten bits.

As known in the art, an increase of the bit rate in the block code brings about widening a bandwidth when the block code is transmitted in the form of a radio transmission signal OUT as will mentioned hereinafter.

In any case, the multiplexed signal is supplied to a modulator 23 which is given a local frequency signal of an intermediate frequency from a local oscillator 24. The modulator 23 which may carry out, for example, phase shift keying, modulates the multiplexed signal by the local frequency signal into a modulated wave which is sent to a transmitter unit 25. The modulated wave is converted by the transmitter unit 25 into the radio transmission signal OUT.

In FIG. 2, the radio transmission signal OUT is delivered to the receiver 11 as a reception signal RIN. In the illustrated receiver 11, the reception signal RIN is received by a receiver unit 26 to be converted into an intermediate frequency signal by the receiver unit 26. The intermediate frequency signal is supplied to a multiplier or mixer 27 which is given a local frequency signal of an intermediate frequency from a local oscillator 28. The multiplier 27 carries out plesiochronous or quasi-synchronous detection of the intermediate frequency signal by the use of the local frequency signal to produce a detected signal representative of a result of detection.

The detected signal is sent to a decision feedback equalizer 29. The decision feedback equalizer 29 adaptively equalizes undesirable wave distortion of the detected signal which stems from multipath fading, and consequently produces an equalized detected signal. The equalized detected signal is supplied to an error correction decoder 30 as a reproduced block code. The error correction decoder 30 calculates a syndrome in response to the reproduced block code in a known manner to correct an error or errors in the reproduced block code with reference to the syndrome and to produce an error corrected block code as an output data signal DO.

The illustrated error correction apparatus has disadvantages as previously discussed.

Figure 3:
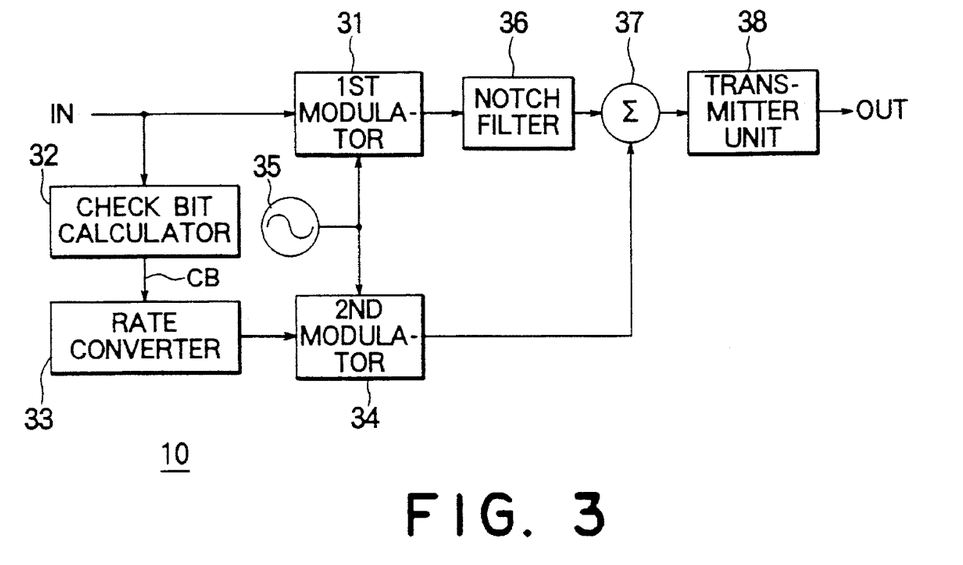
FIG. 3 is a block diagram of a transmitter which is for use in an error correction apparatus according to a preferred embodiment of this invention.
Figure 4:
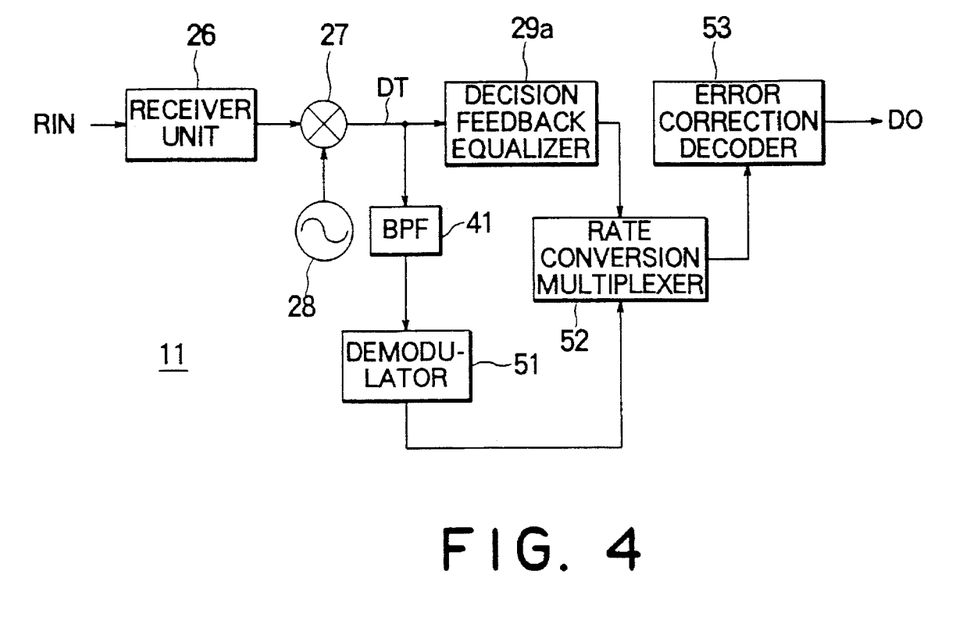
FIG. 4 is a block diagram of a receiver for use in combination with the transmitter illustrated in FIG. 3.

Referring to FIGS. 3 and 4, an error correction apparatus according to a preferred embodiment of the present invention comprises a transmitter 10 and a receiver 11 both of which are illustrated in FIGS. 3 and 4, respectively. Like in FIG. 1, it is assumed that the transmitter 10 illustrated in FIG. 3 internally produces a BCH (31, 21) code as a block code and is supplied with input data bit signals IN which are sequentially produced but are not in the form of a burst. The input data bit signals IN have a preselected bit rate and a prescribed bandwidth or a prescribed frequency spectrum determined by the preselected bit rate. The input data bit signals IN are divisible into a plurality of input data bit signal sequences each of which may be composed of, for example, twenty-one bits. Each of the input data bit signal sequences is inputted to both a first modulator 31 and a check bit calculator 32 which may be similar to the modulator 23 and the check bit calculator 21 (FIG. 1), respectively.

From this fact, it is readily understood that the illustrated check bit calculator 32 produces a check bit signal sequence of ten bits for each input data bit signal sequence in accordance with a predetermined generator polynomial. The check bit signal sequence of ten bits has a check bit rate equal to the preselected bit rate of the input data bit signals and is sent to a rate converter 33 which converts the check bit rate of the check bit signal sequence in a following manner.

Figure 5:
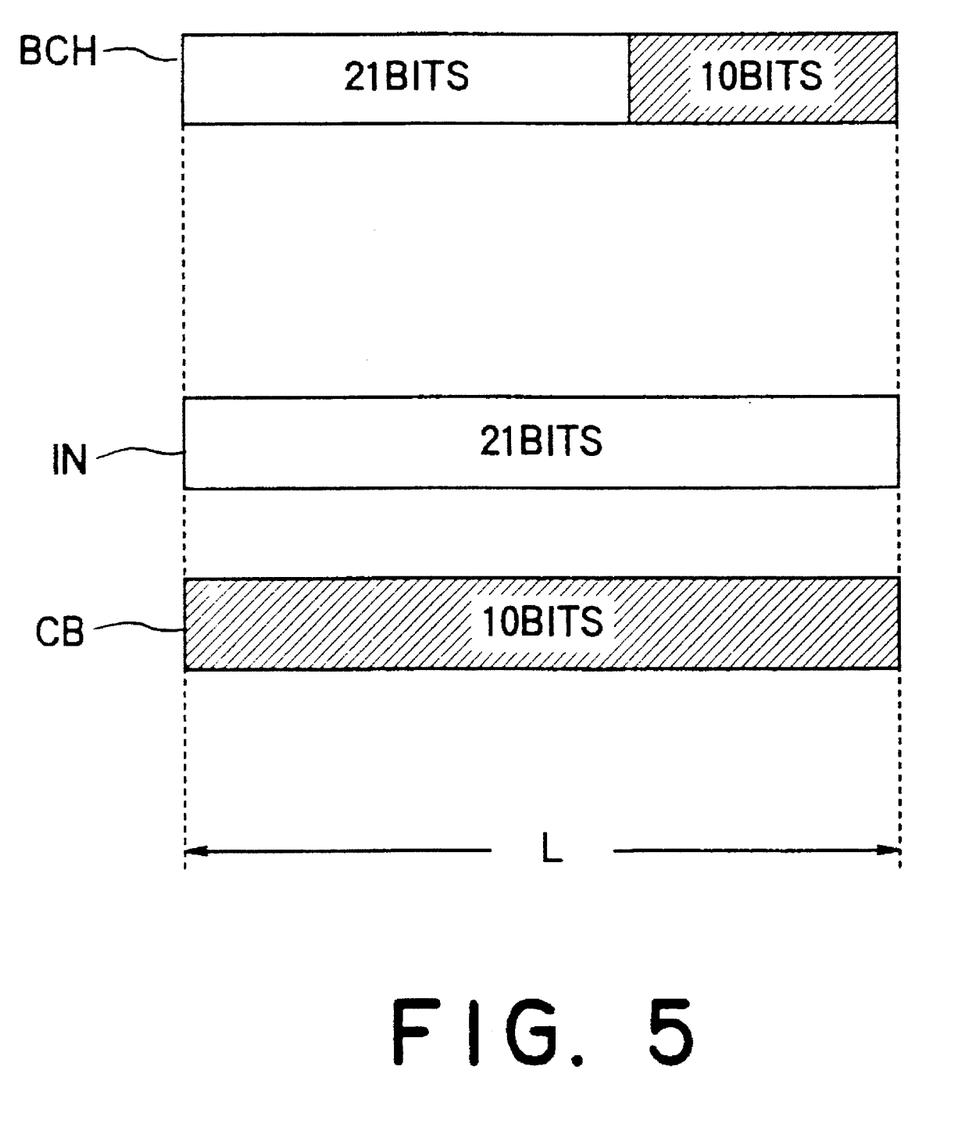
FIG. 5 shows an example of a block code used in the error correction apparatus according to this invention.

Temporarily referring to FIG. 5, it is known in the art that a usual BCH (31, 21) code is composed of the input data bit signal sequence IN of twenty-one bits and the check bit signal sequence CB of ten bits and has a block length depicted at L, as shown in FIG. 5, even when the input data bit signal sequence of twenty-one bits has a time interval equal to the block length L. This shows that each of the input bit signal sequence IN and the check bit signal sequence CB is compressed within the block length L in a known manner and, as a result, the usual BCH (31.21) code is spread in a frequency bandwidth or a frequency spectrum as compared with the frequency bandwidth of the input data bit signal sequence.

Taking the above into consideration, the illustrated input data bit signal sequence is expanded to the predetermined block length L, even when a length of the input data bit signal sequence is shorter than the block length L, as depicted at IN in FIG. 5. Such expansion is possible by the use of a conventionally known technique and is not always necessary when the input data bit signal sequence has a length equal to the block length L. In addition, the check bit signal sequence CB is also expanded to the predetermined block length L by the rate converter 33 illustrated in FIG. 3, as shown in FIG. 5 and is produced as a rate converted check bit signal sequence. This means that the check bit signal sequence CB is reduced in a bit rate and that each bit of the rate converted check bit signal sequence lasts for a time interval of ten bits/L (seconds).

Inasmuch as the bit number of the rate converted check bit signal sequence is near to a half of the bit number of the input data bit signal sequence IN in the BCH (31, 21) code, the rate converted check bit signal sequence has a frequency bandwidth which is nearly equal to a half of a bandwidth of the input data bit signal sequence IN. The rate converted check bit signal sequence is inputted to a second or a check bit modulator 34 and modulated in the second modulator 34 into a check bit modulated signal sequence by a local frequency signal sent from a local oscillator 35.

The input data bit signal sequence IN is sent to the first modulator 31 which is supplied with the local frequency signal from the local oscillator 35. The first modulator 31 modulates the input data bit signal sequence IN by the local frequency signal into a data bit modulated signal which is inputted to a notch filter 36. Practically, the center frequency of the data bit modulated signal is equal to the frequency of the local frequency signal. The notch filter 36 has a filter characteristic such that a frequency notch or fade is given within a frequency region including the center frequency and has a frequency bandwidth wider than the frequency bandwidth of the check bit modulated signal sequence. As a result, the notch filter 36 produces a filtered or faded data bit signal which has a frequency bandwidth equal to that of the data bit modulated signal and which exhibits a frequency spectrum partially cut away in the region of the center frequency. The check bit modulated wave has a narrower frequency bandwidth than that of the data bit modulated wave and its center frequency is equal to the notch frequency of the notch filter 36.

The filtered or faded data bit signal and the check bit modulated signal sequence are supplied to an adder or combiner 37 to be combined together into a combined modulated wave. The combined modulated wave exhibits a frequency spectrum such that the modulated check bit signal sequence is located or inserted in the region cut away from the frequency spectrum of the filtered data bit signal. This shows that the filtered data bit signal and the check bit modulated signal sequence is frequency multiplexed by the combiner 37 and that the combined modulated wave is a frequency-multiplexed signal. The combined modulated wave is sent to a transmitter unit 38 to be converted into a radio transmission output signal OUT.

Referring back to FIG. 4, the radio transmission output signal OUT in FIG. 3 is received as a reception input signal RIN of a radio frequency by the receiver 11 illustrated in FIG. 4. The receiver 11 shown in FIG. 4 comprises similar parts designated by like reference numerals in FIG. 2. Like in FIG. 2, the reception input signal RIN is received by the receiver unit 26 to be converted by the receiver unit 26 into an intermediate frequency signal of an intermediate frequency. The intermediate frequency signal is mixed or multiplied in the multiplier 27 with a local frequency signal of an intermediate frequency sent from the local oscillator 28. Consequently, the multiplier 27 carries out plesiochronous detection of the intermediate frequency signal to produce a detected signal DT which is sent to the decision feedback equalizer (DFE) 29a on one hand and a band pass filter (BPF) 41 on the other hand.

Figure 6:
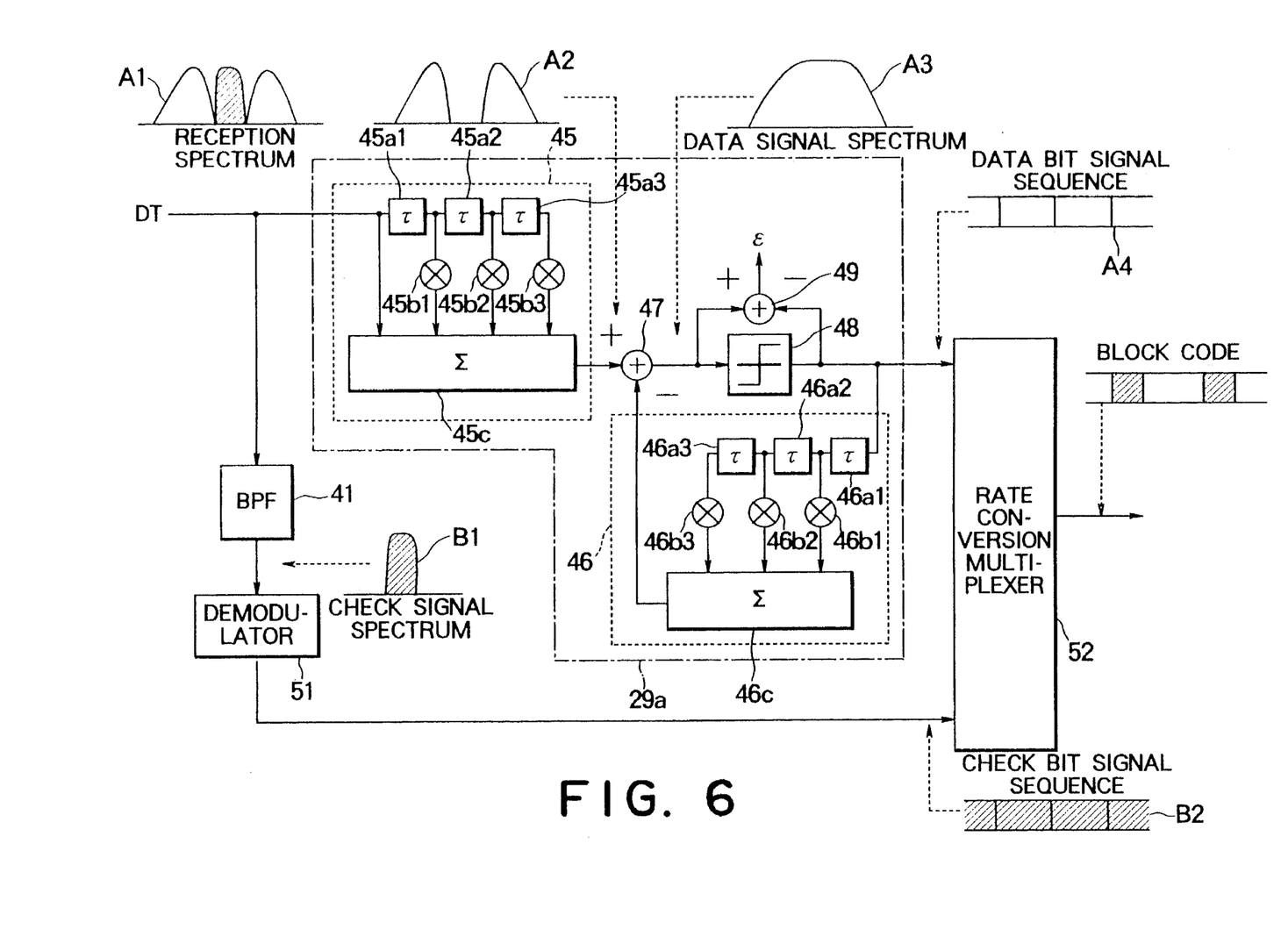
FIG. 6 is a block diagram for use in describing a part of the receiver in detail.

Referring to FIG. 6 and FIG. 4, the decision feedback equalizer (DFE) 29a will be described in detail for a better understanding of this invention. The decision feedback equalizer 29a illustrated in FIG. 6 is supplied with the detected signal DT which has a reception spectrum or a reception frequency band as depicted at A1 in FIG. 6. The reception spectrum A1 has a center frequency region hatched in FIG. 6 and a pair of side band frequency regions. The center frequency region is used for carrying the check bit signal sequence in the form of check symbols while the side band frequency regions are used for carrying the input data bit signal sequence in the form of data symbols, as readily understood from the above description related to FIG. 3. Herein, it is to be noted that a sum of the center frequency region and the side band frequency regions is equal to a frequency band necessary for the input data bit signal sequence. The data signal symbol period is assumed to be T and the check bit signal symbol period becomes longer than T because the check bit symbol rate is lower than that of the data signal.

In FIG. 6, the decision feedback equalizer 29a comprises a forward filter 45 and a backward filter 46 each of which is structured by a transversal filter. More specifically, the forward filter 45 comprises first through third delay elements 45a1 to 45a3 each of which has a delay time $\tau$ equal to the transmission symbol period T and which form a delay line having first through fourth taps. In addition, the forward filter 45 further comprises first through third complex multipliers 45b1 to 45b3 connected to output terminals, namely, the second through the fourth taps of the first through the third delay elements 45a1 to 45a3 and an adder 45c supplied through the first tap with the detected signal DT and multiplier output signals of the first through the third complex multipliers 45b1 to 45b3.

Likewise, the backward filter 46 comprises first through third delay elements 46a1 to 46a3 each of which has the delay time $\tau$, first through third complex multipliers 46b1 to 46b3 connected to output terminals, namely, taps of the first through the third delay elements 46a1 to 46a3, and an adder 46c connected to the first through the third complex multipliers 46b1 to 46b3. The output terminals of the first through the third delay elements 46a1 to 46a3 may be referred to as first through third taps, respectively.

Furthermore, the decision feedback equalizer 29a comprises a subtracter 47 connected to the forward and the backward filters 45 and 46, a decision circuit 48 connected to the subtracter 47, and a subtracter 49 connected to input and output terminals of the decision circuit 48.

In general, a decision feedback equalizer is known as a circuit for removing an intersymbol interference which results from multipath fading.

Moreover, it is also known that the decision feedback equalizer serves to remove a continuous wave (CW) interference when the detected signal DT is directly supplied to the adder 45c through the first tap of the forward filter 45, as illustrated in FIG. 6. Inasmuch as a technique of removing or cancelling the CW interference is described in a paper which is contributed by Loh-Ming Li et al to IEEE TRANSACTIONS ON COMMUNICATIONS, VOL. COM. 31, NO. 4, April 1983 and which is entitled "Rejection of CW Interference in QPSK Systems Using Decision-Feedback Filters", description will not be made in detail as regards such removal of the CW interference.

As mentioned before, the detected signal DT is supplied to the forward filter 45 and is directly sent to the adder 45c through the first tap of the delay line, as illustrated in FIG. 6.

In FIG. 6, let the detected signal DT on the first and the second taps be called first and second detected signals which are depicted at r0 and r1, respectively.

In addition, the detected signal DT includes a digital modulated wave as a desired wave and an undesired wave, namely, an interference wave which may be assumed to appear in the form of a continuous wave (CW). Herein, it is surmised that a symbol of the digital modulated wave is represented by Si while the interference wave is represented by $J\exp(j\Omega t)$ on the assumption that the interference wave is the continuous wave having an angular frequency $\Omega$, where J is representative of the CW interference component.

Under the circumstances, when a decision data output signal in the decision feedback equalizer 29a is represented by $S_0$, the first and the second detected signals r0 and r1 on the first and the second taps are given by:

$$r0 = S_0 + J\exp(j\Omega t), \text{ and} \quad (1)$$

$$r1 = S_{-1} + J\exp(j\Omega t)\exp(j\Omega t), \text{ respectively.} \quad (2)$$

When it is supposed that a tap coefficient of the first multiplier 45b1 is given by $C1 = -\exp(j\Omega t)$ and tap coefficients of the second and the third multipliers 45b2 and 45b3 are equal to zero, an output signal y of the adder 45c is given by:

$$\begin{aligned} y &= r0 + C1 \times r1 \\ &= S_0 - \exp(j\Omega t) \times S_{-1} \end{aligned}$$

where $S_{-1}$ is representative of a symbol preceding a desired symbol $S_0$ by one symbol.

From Equation 3, it is readily understood that the CW interference component J is removed from the output signal y of the adder 45c but an undesired component, namely, $S_{-1}$ is mixed in the output signal y with the desired symbol. This shows that the output signal y is subjected to intersymbol interference from a preceding symbol and consequently a wave distortion.

Herein, it is to be noted that a decision result for the preceding symbol $S_{-1}$ is left on the first tap of the first delay element 46a1 in the backward filter 46. Taking this into consideration, the decision result on the first tap of the first delay element 46a1 is sent to the first multiplier 46b1 to be multiplied by a tap coefficient given by $d1 = -\exp(j\Omega t)$. A product of the decision result and the tap coefficient d1 is given by $d1 \cdot S_{-1}$ and sent to the adder 46c. The remaining tap coefficients are assumed to be equal to zero in the example illustrated in FIG. 6. As a result, the adder 46c produces an adder output signal represented by $d1 \cdot S_{-1}$ and supplies the adder output signal to the subtracter 47 to be subtracted from the output signal y of the forward filter 45. This enables removal of the intersymbol interference because the decision feedback equalizer 29a produces an equalized output signal Z given by:

$$Z = y - d1 \cdot S_{-1} = S_0.$$

Thus, the decision feedback equalizer 29a can remove or cancel the CW interference without giving any wave distortion to the desired wave symbol $S_0$.

In the above-mentioned description, consideration has been made only about the removal of the CW interference but no consideration is made about removal of any other interference waves. Therefore, it is difficult to judge whether or not the center region of the reception spectrum A1 (FIG. 6) alone can be separated or removed from the reception spectrum A1 by the use of the decision feedback equalizer illustrated in FIG. 6.

However, consideration has been already made by the present inventor et al about removal or cancellation of a wide band interference wave by the use of a decision feedback equalizer in a paper B-331 which is published on Autumn meeting (1992) held by Electronic Information Communication Institute in Japan and which is entitled "Wide Band Interference Cancellation by a Decision Feedback Equalizer". In the paper, it is pointed out that the interference wave can be cancelled when it is not a continuous wave but a modulated wave which has, for example, a certain frequency bandwidth. Thus, the paper indicates that not only a single CW and a plurality of CW's but also a modulated wave with a certain bandwidth can be cancelled by displacing or shifting a reference tap position of a forward filter from a last tap position to a different tap position. In other words, such cancellation of a modulated wave is possible by selecting, as the reference tap position, a tap position different from the last tap position.

In a paper B-418 which is published by the instant inventor on Spring National Meeting held 1992 by Electronic Communication Information Institute in Japan and which is entitled "CW interference Cancellation Characteristic in Multipaths of a Decision Feedback Equalizer", the instant inventor also reports that it is possible to cancel both interference waves and multipath distortion by the use of a decision feedback equalizer with a shifted reference tap even when multipath fading takes place.

Taking the above into account, when a reception signal suffers in multipaths from CW interferences, M in number, which have angular frequencies $\Omega i$, it is known that normal equations of a decision feedback equalizer with a shifted reference tap are give by:

$$\begin{bmatrix} R(1-n) & H^{*T}(n-1)S \\ H(1-n) & I \end{bmatrix} \begin{bmatrix} c \\ d \end{bmatrix} = \begin{bmatrix} h^*(-1)S \\ 0 \end{bmatrix} \quad (3)$$

$$R(m) = \sum_{i=-\infty}^{\infty} h(i)h^*(i-m)S + \sum_{i=1}^{M} J_i \exp(j\Omega_i mT) + \delta m\sigma^2 \quad (4)$$

where S and Ji represent reception electric power of a desired wave and CW interferences, respectively; h(i), a sample value of an impulse response in a transmission path; c and d, tap coefficient vectors of the forward and the backward filters 45 and 46 in the decision feedback equalizer; H(m) is a matrix including h(m) as elements; and an asterisk (*), a complex conjugation. In Equation 3, the first term on the lefthand side is representative of a correlation matrix $\Phi$ while Equation 4 can be made to correspond to Equations 1 and 2 as mentioned above and R(m) may therefore be made to correspond to the correlation matrix $\Phi$. In addition, it may be considered that the first and the second terms on the righthand side of Equation 4 correspond to correlation matrices $\Phi s$ and $\Phi j$ of the desired wave and the CW interferences, respectively, and the third term corresponds to a receiver noise component. The remaining factors or symbols in Equations 3 and 4 are usually known in the art and will not be described any longer.

In any case, it is understood from Equations 1 and 4 that the correlation matrix $\Phi$ on the lefthand side of Equation 4 may be regarded as a sum of the correlation matrix $\Phi s$ of the desired wave and the correlation matrix $\Phi j$ related to the CW interferences. This means that solutions of Equation 1 satisfy both solutions for equalization of the multipath distortion and solutions for removal of the CW interferences.

Herein, it is to be noted that Equation 4 also holds for a modulated wave interference except a plurality of the CW interferences when a correlation matrix $E[J*J]$ of a jamming wave is substituted for the second term of Equation 4. In this event, the decision feedback equalizer does not carry out a notch filtering operation but carries out a band rejection filtering operation to remove an undesired bandwidth of an undesired wave.

Now, consideration will be made about physical significance of the above-mentioned facts. As mentioned before, it is possible to form a notch of a very narrow band by linearly synthesizing output signals sent from the reference tap, namely, the first tap of the forward filter 45 in FIG. 6 and the second tap of the forward filter 45. Such linear synthesizing operation may be carried out in connection with output signals sent from the first tap and the fourth tap of the forward filter 45 to form a notch. Thus, it is possible to control a narrow bandwidth of the notch by selecting independent notch characteristics which are linearly synthesized.

From this fact, it is readily understood that a modulated interference wave which has a bandwidth can be cancelled by minimizing a square average value of an error ε obtained from the subtracter 49 in response to output signals of the decision circuit 48 and the subtracter 47. This means that the band rejection filtering operation can be made by controlling or combining a plurality of the notch filtering operations.

Turning back to FIG. 6, the decision feedback equalizer 29a can cancel or remove the center region from the reception spectrum A1 by the above-mentioned band rejection filtering operation. In other words, the check bit modulated wave is removed from the reception spectrum A1. As a result, the forward filter 45 produces a filtered or faded output signal which has a frequency spectrum depicted at A2 in FIG. 6.

The backward filter 46 carries out removal operation of an intersymbol interference and, as a result, a normal data bit spectrum is reproduced as the output signal of the subtracter 47, as illustrated at A3 in FIG. 6, and is free from the waveform distortion and the interferences. Consequently, the decision circuit 48 produces a sequence of reproduced or detected data bit signals, as depicted at A4 in FIG. 6, after the output signals of the subtracter 47 are judged by the decision circuit 48.

As illustrated in FIG. 6, the detected signal DT has the reception spectrum A1 wherein a check signal spectrum is located in the center region between data signal spectra for the data bit signal sequence. This shows that the data signal spectra is partially cut away to place the check signal spectrum in a cut-away region. Thus, frequency multiplex is carried out so that no interference takes place between the check signal spectrum and the data signal spectra.

In FIGS. 4 and 6, the detected signal DT which has the reception spectrum A1 as shown in FIG. 6 is delivered to the band pass filter (BPF) 41 which allows only the check signal spectrum B1 (FIG. 6) to pass therethrough. The check signal spectrum B1 is sent to a demodulator 51 to be demodulated into a sequence of reproduced check bit signals B2 in a known manner. Thus, the reproduced check bit signal sequence is extracted from the detected signal DT as an extracted check bit signal sequence.

The reproduced data bit signal sequence A4 is supplied to a rate conversion multiplexer 52 along with the reproduced check bit signal sequence B2. Both the reproduced data bit signal sequence A4 and the reproduced check bit signal sequence B2 exhibit a time relationship identical with that of the input data bit signal sequence IN and the check bit signal sequence CB, as already illustrated in FIG. 5. Under the circumstances, the rate conversion multiplexer 52 carries out rate conversion of the reproduced data bit signal sequence A4 to produce a converted data bit signal sequence which has a rate equal to 31/21 times of the rate of the reproduced data bit signal sequence A4. On the other hand, the rate conversion multiplexer 52 converts the rate of the reproduced check bit signal sequence into a converted rate which is equal to 31/10 times of the rate of the reproduced check bit signal sequence. In any event, a converted check bit signal sequence is produced within the rate conversion multiplexer 52. Such rate conversion is readily carried out by the use of two different rate converters known in the art.

After the rate conversion is finished, the rate conversion multiplexer 52 multiplexes the converted data bit signal sequence and the converted check bit signal sequence in a known manner to produce a multiplexed signal which is identical with the BCH (31, 21) code illustrated in FIG. 5 and which will therefore be referred to as a reproduced BCH (31, 21) code.

Referring back to FIG. 4, the reproduced BCH (31, 21) code is sent to an error correction decoder 53 which calculates syndromes in response to the reproduced BCH (31, 21) code and which executes error correction in the converted data bit signal sequence with reference to the syndromes.

With this structure, the rate of the data bit signal sequence is reduced in a radio transmission path to the rate of 21/31 time in comparison with the rate of the BCH (31, 21) code. In addition, the check bit signal sequence is transmitted in parallel with the data bit signal sequence within a single frequency region without using a superfluous frequency channel. Accordingly, the bandwidth is not expanded or spread by adding the check bit signal sequence to the data bit signal sequence to form the block code.

As mentioned before, the data bit signal sequence and the check bit signal sequence for error correction are expanded to the same time interval and are independently modulated in the transmitter so that the check bit modulated wave falls within the signal band for the data bit modulated wave. Therefore, no expansion of the bandwidth takes place even when the check bit signal sequence is added to the data bit signal sequence. This means that a desired error correction ability can be accomplished by the use of the error correction apparatus without any expansion or spread of the bandwidth.

Although an error correction code which has low error correction ability is used in conventional digital microwave communication on which strict band restriction is imposed, this invention can achieve high error correction ability without expansion of the frequency band, a high transmission quality, and an improved frequency utilization.

Specifically, the error correction apparatus according to this invention is effective to transmit a block code which has the rate of several megahertz or a higher rate.

While this invention has thus far been described in conjunction with a preferred embodiment thereof, it will be readily possible for those skilled in the art to put this invention into practice in various other manners. For example, a wide variety of BCH codes may be used in the error correction apparatus while Reed-Solomon code or the like may be used as the block code instead of the BCH code. In addition, the check bit modulated wave may not be located at the center region of the predetermined frequency band but may be placed at a region different from the center region within the predetermined frequency band. The check bit modulated signal may be separated from the data signal modulated wave without using the decision feedback equalizer.

What is claimed is:

1. A transmitter adapted to be responsive to a sequence of data bit signals arranged in a predetermined time interval, and further adapted for transmitting a transmission signal including said data bit signal sequence and a sequence of check bit signals determined for said data bit signal sequence, comprising:

means adapted for receiving said data bit signal sequence and for determining a check bit signal sequence for said data bit signal sequence, said check bit signal having a check bit rate;

means for converting said check bit rate of said check bit signal sequence and thereby providing a converted check bit signal sequence having a time interval equal to said predetermined time interval of the data bit signal sequence;

means for individually modulating said converted check bit signal sequence and said data bit signal sequence by the use of a predetermined carrier frequency into a check bit modulated wave and a data bit modulated wave, respectively, said data bit modulated wave having a central data frequency and a data frequency band about said central data frequency and said check bit modulated wave having a central check bit frequency equal to said central data frequency;

means for fading the central data frequency of the data bit modulated wave and thereby providing a faded data bit modulated wave;

means for combining said faded data bit modulated wave with said check bit modulated wave to produce a combined wave which includes said faded data bit modulated wave and said check bit modulated wave; and means adapted for transmitting said combined wave as said transmission signal.

2. A receiver for use in combination with the transmitter claimed in claim 1, comprising:

means for receiving said transmission signal as a reception wave and for detecting said transmission signal and for providing a detection signal representative of said reception wave;

means for carrying out a decision feedback equalization of said detection signal to produce a detected data bit signal sequence;

means for extracting said check bit signal sequence to produce an extracted check bit sequence;

means for inversely converting said detected data bit signal sequence and said extracted check bit sequence into a reversed data bit signal sequence and a reversed check bit sequence, respectively, and multiplexing said reversed data bit signal sequence and said reversed check bit sequence into a multiplexed block code; and means for correcting at least one error of said multiplexed block code to produce an error-corrected data bit signal sequence representative of said data signal sequence.

3. In an error correction apparatus including a transmitter and a receiver, said transmitter adapted to transmit a sequence of data bit signals having a predetermined time interval and a sequence of check bit signals from said transmitter to said receiver, said transmitter comprising:

means adapted for receiving said data bit signal sequence and for determining a check bit signal sequence for said data bit signal sequence, said check bit signal having a check bit rate;

means for converting said check bit rate of said check bit signal sequence and thereby providing a converted check bit signal sequence having a time interval equal to said predetermined time interval of the data bit signal sequence;

means for individually modulating said converted check bit signal sequence and said data bit signal sequence by the use of a predetermined carrier frequency into a check bit modulated wave and a data bit modulated wave, respectively, said data bit modulated wave having a central data frequency and a data frequency band about said central data frequency and said check bit modulated wave having a central check bit frequency equal to said central data frequency;

means for fading the central data frequency of the data bit modulated wave and thereby providing a faded data bit modulated wave;

means for combining said faded data bit modulated wave with said check bit modulated wave to produce a combined wave which includes said faded data bit modulated wave and said check bit modulated wave; and means adapted for transmitting said combined wave as said transmission signal;

said receiver comprising:

means for receiving said transmission signal as a reception wave and for detecting said transmission signal and for providing a detection signal representative of said reception wave;

means for carrying out a decision feedback equalization of said detection signal to produce a sequence of detected data signals;

means for extracting said check bit signal sequence to produce an extracted check bit sequence;

means for inversely converting said detected data bit signal sequence and said extracted check bit sequence into a reversed data bit signal sequence and a reversed check bit sequence, respectively, and multiplexing said reversed data bit signal sequence and said reversed check bit sequence in to a multiplexed block code; and means for correcting at least one error of said multiplexed block code to produce an error-corrected data bit signal sequence representative of said data signal sequence.

4. In an error correction apparatus having a transmitter adapted for transmitting a block code as a transmission signal within a predetermined frequency band, said block code including a sequence of data bit signals together with a sequence of check bit signals for correction of said data bit signal sequence, said transmitter comprising:

check bit calculation means for determining said check bit signal sequence for said data bit signal sequence, said check bit signal having a predetermined bit rate;

data modulating means for modulating said data bit signal sequence into a modulated data bit signal sequence having a predetermined frequency band;

filtering means for filtering said modulated data bit signal sequence into a filtered data bit signal having a partially rejected frequency region within said predetermined frequency band;

check bit modulating means for modulating said check bit signal sequence into a check bit modulated signal having a check bit frequency region within said partially rejected frequency region; and combining means coupled to said filtering means and said check bit modulating means for combining said filtered data bit signal with said check bit modulated signal within said predetermined frequency band into a combined signal, and adapted to transmit said combined signal as said transmission signal.

5. A receiver for use in combination with the transmitter claimed in claim 4, said receiver adapted to receive said transmission signal as a reception signal within said predetermined frequency band, said receiver further adapted to transmit an output data signal, comprising:

- detecting means for detecting said reception signal to produce a detected signal including said data bit signal sequence and said check bit signal sequence;
- data detecting means for detecting said data bit signal sequence as a reproduced data bit signal sequence from said detected signal;
- check bit detecting means for detecting said check bit signal sequence as a reproduced data bit signal sequence from said detected signal;
- synthesizing means coupled to said data detecting means and said check bit detecting means for synthesizing said reproduced data bit signal sequence and said reproduced check bit signal sequence, and for providing a synthesized signal including said reproduced data bit signal sequence and said reproduced check bit signal sequence; and
- error correcting means for correcting said reproduced data bit signal sequence as part of said synthesized signal with reference to said reproduced check bit signal sequence, and for providing thereby an error-corrected data bit signal sequence as said output data signal.

6. A transmitter adapted for receiving a data bit sequence of a predetermined time interval, and for transmitting said data bit signal sequence along with a check bit signal sequence determined for said data bit signal sequence, comprising:

- a check bit calculator adapted to receive said data bit signal sequence and provide a check bit signal sequence in accordance with said data bit signal sequence, said check bit signal sequence having a check bit rate;
- a check bit rate converter for converting said check bit rate of said check bit signal sequence and thereby providing a converted check bit signal sequence having a time interval equal to said predetermined time interval of said data bit signal sequence;
- a data bit modulator for modulating said data bit signal sequence with a predetermined carrier frequency and thereby providing a data bit modulated wave, said data bit modulated wave having a central data frequency and a data frequency band about said central data frequency;
- a check bit modulator for modulating said converted check bit signal sequence with a predetermined carrier frequency and thereby providing a check bit modulated wave having a central check bit frequency equal to said central data frequency of said data bit modulated wave;
- a notch filter for fading the central data frequency of the data bit modulated wave and thereby providing a faded data bit modulated wave;
- an adder for combining said faded data bit modulated wave with said check bit modulated wave to produce a combined wave which includes said faded data bit modulated wave and said check bit modulated wave; and
- a transmitter unit adapted for transmitting said combined wave as a transmission signal.

7. A receiver for use in combination with said transmitter claimed in claim 6, comprising:

- a receiver unit adapted to receive said transmission signal as a reception wave, said receiver unit being further adapted to convert said reception wave into an intermediate frequency signal;
- a multiplier for receiving said intermediate frequency signal and providing plesiochronous detection of the intermediate frequency signal to provide a detection signal;
- a decision feedback equalizer for receiving said detection signal and carrying out decision feedback equalization of said detection signal to produce a detection data bit signal sequence;
- a band pass filter for receiving said detection signal representative of said reception wave and filtering said detection signal such that a check signal spectrum is transmitted from said band pass filter;
- a demodulator for receiving said check signal spectrum and demodulating said check signal spectrum into a sequence of reproduced check bit signals, said reproduced check bit signal sequence being transmitted from said demodulator as an extracted check bit signal sequence of said detection signal;
- a rate conversion multiplexer for inversely converting said detection data bit signal sequence and said extracted check bit signal sequence into a reversed data bit signal sequence and a reversed check bit signal sequence, respectively, and multiplexing said reversed data bit signal sequence and said reversed check bit signal sequence into a multiplexed block code; and
- an error correction decoder adapted to correct at least one error of said multiplexed block code and thereby providing an error-corrected data bit signal sequence representative of said data signal sequence.

* * * * *